United States Patent [19]

Nishida et al.

[11] Patent Number: 5,729,385
[45] Date of Patent: Mar. 17, 1998

[54] MICROSCOPE OPTICAL SYSTEM

[75] Inventors: Hiroyuki Nishida; Hideyuki Takaoka, both of Hachioji, Japan

[73] Assignee: Olympus Optical Co., Ltd., Tokyo, Japan

[21] Appl. No.: 756,529

[22] Filed: Nov. 26, 1996

[30] Foreign Application Priority Data

Nov. 29, 1995 [JP] Japan .................... 7-310885

[51] Int. Cl.⁶ .................... G03B 13/06; G02B 21/06
[52] U.S. Cl. .................... 359/434; 359/368; 359/385
[58] Field of Search .................... 359/362–363, 359/368–390, 434–435, 676–677

[56] References Cited

U.S. PATENT DOCUMENTS

| | | | |
|---|---|---|---|
| 4,204,748 | 5/1980 | Yonekubo | 359/368 |
| 4,407,569 | 10/1983 | Piller et al. | 359/370 |
| 4,685,776 | 8/1987 | Inoue et al. | 359/363 |
| 4,744,642 | 5/1988 | Yoshinaga et al. | 359/389 |

FOREIGN PATENT DOCUMENTS

| | | | |
|---|---|---|---|
| 55-157712 | of 0000 | Japan . | |
| 7-35986 | 2/1995 | Japan | 359/368 |
| 8-15612 | 1/1996 | Japan . | |

*Primary Examiner*—Thong Nguyen
*Attorney, Agent, or Firm*—Cushman Darby & Cushman Intellectual Property Group of Pillsbury Madison & Sutro, LLP

[57] ABSTRACT

A microscope optical system includes an illumination system for radiating light from a light source toward an object, an objective lens and an imaging lens for forming an image of the object, and an observing optical system for observing the image or a photographing optical system for photographing the image. This microscope optical system is designed so that a relay system constructed as an afocal system with a first positive lens unit and a second positive lens unit is disposed between the objective lens and the imaging lens, and an element for pupil modulation can be disposed at a position nearly conjugate with the pupil of the objective lens relayed by the relay system, satisfying a condition:

$$f2/f1 > 1.2$$

where $f1$ is the focal length of the first positive lens unit and $f2$ is the focal length of the second positive lens unit.

9 Claims, 7 Drawing Sheets

FIG. 9A
SPHERICAL
ABERRATION
NA=0.025

-0.50  0.50

FIG. 9B
ASTIGMATISM
IM.H=11.0

-0.50  0.50

FIG. 9C
SPHERICAL
ABERRATION
NA=0.061

-0.50  0.50

FIG. 9D
ASTIGMATISM
IM.H=4.5

MICROSCOPE OPTICAL SYSTEM

BACKGROUND OF THE INVENTION

1. Field of the Invention

This invention relates to a microscope optical system in which the imaging performance of the optical system is improved or altered by providing a pupil function with modulation at a position nearly conjugate with the pupil of an objective lens in an observing or imaging system of a microscope to attain, for example, high resolution and contrast of an image.

2. Description of Related Art

Figure 1:
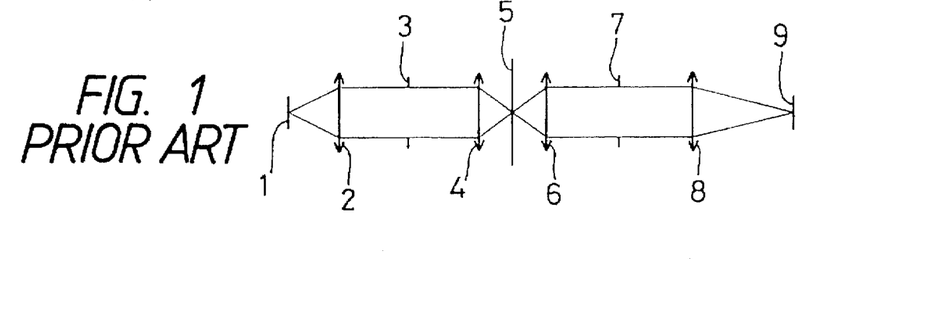
FIG. 1 is a conceptual view showing the arrangement of a conventional microscope optical system.

In a conventional microscope optical system, as shown in FIG. 1, light emitted from a light source 1 is rendered parallel by a collector lens 2 and is radiated through a condenser lens 4 toward a sample 5. The light reflected or transmitted by the sample 5, after passing through an objective lens 6 of an infinite system and an imaging lens 8, forms an image 9 of the sample 5. In this figure, reference numeral 3 represents a position conjugate with the position of the pupil (image focal point) of the condenser lens 4, and 7 represents the position of the pupil (image focal point) of the objective lens 6.

For the microscope optical system constructed as in the foregoing, there is the technique of altering the image performance of the optical system by placing filters or equivalents at the pupil position 7 of the objective lens 6 or a position conjugate therewith and at the position 3 conjugate with the pupil position of the condenser lens 4. Such techniques are proposed, for example, by U.S. Pat. No. 4,407,569, Japanese Patent Preliminary Publication No. Sho 55-157712, and Japanese Patent Application No. Hei 6-151122.

Also, the position conjugate with the pupil position 7 of the objective lens 6 is not shown in FIG. 1, but where a relay lens or the like is disposed on the exit side of the objective lens 6, an image of the pupil of the objective lens 6 may be formed in an imaging system, and here is the position conjugate with the pupil position 7 of the objective lens 6.

In general, the microscope using the objective lens of an infinite system needs a relay system composed of a combination of two positive lens units to relay both the image of the sample and the pupil of the objective lens and ensure sufficient space for pupil modulation (namely, for providing a pupil function with modulation) at the position of the relayed pupil of the objective lens. In the arrangement of the conventional microscope optical system, compact design of the entire microscope optical system has been intended in such a way that the focal lengths of the two lens units constituting the relay system are equalized to construct an afocal system with a magnification of 1× or the focal length of the front lens unit of the relay system is rendered longer than that of the rear lens unit to construct a demagnifying afocal system, thereby reducing the diameter of a beam of light emerging from this afocal system. However, when the magnification of the objective lens for image formation is increased, the pupil of the objective lens becomes considerably small in size. Subsequently, this pupil, when demagnified by the relay system, becomes smaller and thus an element for pupil modulation must be miniaturized. The manufacture and positioning adjustment of such a small element are difficult in practice.

U.S. Pat. No. 4,407,569 mentioned above is designed to place the modulation element at the position of the relayed pupil of the objective lens, but fails to specifically describe the magnification of the relay system of the pupil. Although Hei 6-151122 refers to the magnification of projection of the pupil, this magnification is. 0.4–1.1×, and thus when an objective lens with a small pupil diameter and high magnification is used, the diameter of the relayed pupil becomes smaller and the problem stated above is encountered. Finally, Sho 55-157712 is such that a pupil projecting position is set between two lens systems, but the relay system is not constructed as the afocal system. In other wards, this arrangement is made so that both the image and the pupil are relayed by the relay system of a finite system. In such a case, when a positioning adjustment relative to the image and the pupil, for example, adjustment for perlocality, is made, the position of each of the image and the pupil cannot be adjusted independently, and thus the problem occurs that if one position is adjusted, the other will be changed.

SUMMARY OF THE INVENTION

It is, therefore, an object of the present invention to provide a microscope optical system in which the magnification of the relay system (hereinafter referred to as the relay magnification) of the pupil of the objective lens is changed so that the relay magnification of the pupil and the magnification of the entire afocal system can be set independently of each other, and a pupil function is provided with modulation at the position nearly conjugate with the pupil of the objective lens so that the imaging performance of the optical system can be altered.

In order to achieve the above object, the microscope optical system according to the present invention includes an illumination system for radiating light from a light source toward an object; an objective lens and an imaging lens for forming an image of the object; and an observing optical system for observing the image of the object or a photographing optical system for photographing the image of the object. The microscope optical system is designed so that a relay system constructed as an afocal system with a first positive lens unit and a second positive lens unit is placed between the objective lens and the imaging lens, and an element for pupil modulation can be disposed at a position nearly conjugate with the pupil of the objective lens relayed by the relay system, which satisfies a condition:

$$f2/f1 > 1.2 \tag{1}$$

where f1 is the focal length of the first positive lens unit of the relay system and f2 is the focal length of the second positive lens unit of the relay system.

Further, the microscope optical system according to the present invention is designed so that a relay optical system composed of a first afocal relay system and a second afocal relay system is placed between the objective lens and the imaging lens, and the position nearly conjugate with the pupil of the objective lens is set between the first afocal relay system and the second afocal relay system.

Still further, the microscope optical system according to the present invention is such that an image relay lens unit and a pupil relay lens unit are arranged between the objective lens and the imaging lens, an optical element for correction for aberrations is disposed adjacent to an intermediate imaging plane produced by the image relay lens unit, and an element for pupil modulation can be placed at the position nearly conjugate with the pupil of the objective lens relayed by the pupil relay lens unit.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Before undertaking the explanation of the embodiments, it will be expedient to describe the functions and features of the microscope optical system of the present invention.

According to the arrangement of the microscope optical system satisfying Eq. (1), the pupil of the objective lens is relayed with a sufficiently large diameter and thus, even though a high-magnification lens is used in the objective lens, the pupil modulation can be made satisfactorily. With this arrangement, the image, when relayed, is demagnified, but this can be completely corrected by changing the imaging lens.

In the microscope optical system of the present invention, it is desirable that either the first or second positive lens unit of the relay system has at least one positive lens, which satisfies a condition:

$$\mu \geq 75 \qquad (2)$$

where $\mu$ is the Abbe's number of the positive lens.

An optical system for pupil modulation needs to be completely corrected for aberrations (notably, chromatic aberration) with respect to the relay of the pupil of the objective lens, as well as that of the image. Low-dispersion glass is therefore used in the optical system, and thereby desired optical performance can be secured. If the first positive lens unit is considered as an image relay lens and the second positive lens unit as a pupil relay lens, chromatic aberration can be corrected for the pupil by using the low-dispersion glass in the second positive lens unit. Moreover, when the low-dispersion glass is used in the first positive lens unit, it becomes possible to favorably correct for chromatic aberration for the image in combination with the imaging lens.

In the microscope optical system of the present invention, it is desirable that an optical element can be placed between the objective lens and the relay optical system to split or change an optical path into a plurality of paths, and an element for pupil modulation is disposed so that it can be moved along the optical axis. This arrangement makes it possible to observe images with and without the pupil modulation at the same time, and also to accommodate the case where a change in the kind of the objective lens causes a shift of the pupil position thereof.

Further, the microscope optical system according to the present invention includes an illumination system for radiating light from a light source toward an object; an objective lens and an imagine lens for forming images of the object; and an observing optical system for observing the image of the object or a photographing optical system for photographing the Image of the object, and is designed so that a first relay system and a second relay system each constructed as an afocal optical system are arranged between the objective lens and the imaging lens, and a position nearly conjugate with the pupil of the objective lens is set between the first relay system and the second relay system.

According to this arrangement, the relay magnification of the pupil of the objective lens is set by the first relay system, and the relay magnification of the image can be set independently by the first and second relay systems. In this way, the number of degrees of design freedom in the microscope optical system is increased. For example, it becomes possible to increase the relay magnification of the pupil of the objective lens to render the relay magnification of the object image onefold. If an afocal system with onefold magnification is constructed, its relay optical path can be designed to form a loop, and images with and without the pupil modulation can at the same time be observed through the same observing system. Moreover, even though lenses constituting the afocal system are moved along the optical axis, the position of the image is not shifted which is formed by the imaging lens placed on the exit side of the afocal system, and thus the pupil modulation can be made without shifting the image position.

It is desirable that the first relay system is constructed as the afocal system composed of the first positive lens unit and the second positive hens unit, and the relationship between the focal length f1 of the first positive lens unit and the focal length f2 of the second positive lens unit satisfies Eq. (1). Consequently, the pupil modulation can be made satisfactorily even when the relay magnification of the pupil of the objective lens is increased, the relay magnification of the image is rendered onefold, and a high-magnification lens is used in the objective lens.

In the microscope optical system of the present invention, it is desirable that an optical element for splitting or changing an optical path into a plurality of paths is placed between the objective lens and the first relay system, and an element for pupil modulation is disposed so that it can be moved along the optical axis. This arrangement makes it possible to observe images with and without the pupil modulation at the same time, and also to accommodate the case where the kind of the objective lens is changed and the pupil position thereof is shifted.

Still further, the microscope optical system according to the present invention includes an illumination system for radiating light from a light source on an object; an objective lens and imaging lenses for forming images of the object; and an observing optical system for observing the images of the object or a photographing optical system for photographing the images of the object, and is designed so that an image relay lens unit and a pupil relay lens unit are arranged between the objective lens and one of the imaging lenses, an optical element for correction for aberrations is disposed adjacent to an intermediate imaging plane produced by the image relay lens unit, and an element for pupil modulation is placed at a position nearly conjugate with the pupil of the objective lens relayed by the pupil relay lens unit.

By this arrangement, for example, chromatic aberration for the pupil (specifically, chromatic aberration for the pupil of the objective lens) yielded outside the pupil relay system can be corrected by the optical element independently disposed adjacent to the intermediate imaging plane. Since chromatic aberration for the pupil produced by the objective lens varies with the kind of the objective lens, optical elements designed to optimize correction for aberrations are prepared and replaced in accordance with objective lenses used, and thereby aberrations can be always maintained in favorable condition.

Moreover, it is desirable that the optical element placed adjacent to the intermediate imaging plane is constructed with a plane-parallel plate composed of two kinds of glass materials cemented to each other which are nearly equal in refractive index but different in Abbe's number. This optical element has no refracting power in itself and is placed adjacent to the intermediate imaging plane, thus correcting for chromatic aberration alone with little effect on final image performance.

In accordance with the embodiments shown in the drawings, the present invention will be explained in detail below.

First Embodiment

Figure 2:
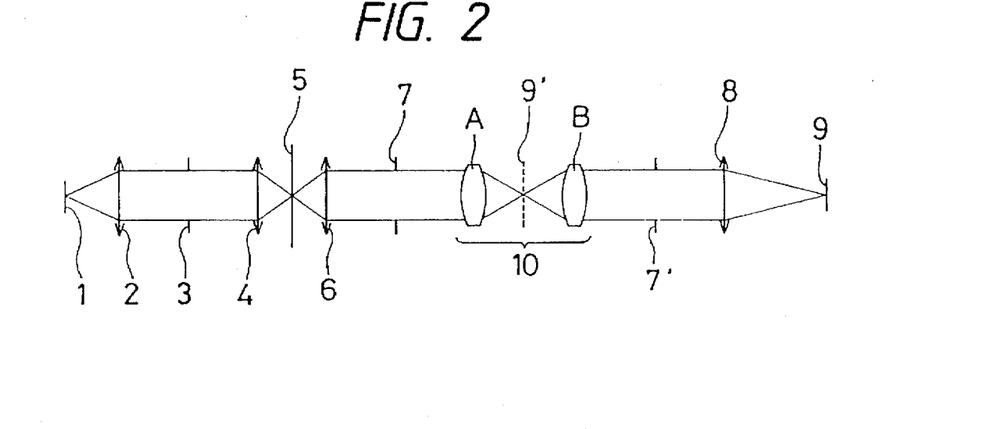
FIG. 2 is a conceptual view showing the arrangement of the microscope optical system of a first embodiment in the present invention.

In the microscope optical system of this embodiment, as shown in FIG. 2, light emitted from a light source 1 is rendered parallel by the collector lens 2 and radiated through the condenser lens 4 toward the sample 5. The light reflected or transmitted by the sample 5, after being collimated by the objective lens 6, passes through a relay system 10 constructed as an afocal system with a first positive lens unit A and a second positive lens unit B, and forms the image 9 of the sample 5 through the imaging lens 8. Also, in this figure, reference numeral 7' denotes the position of the image of the pupil of the objective lens 6 which is relayed by the relay system 10, and 9' denotes the intermediate imaging position of the relay system 10, where the sample 5 is imaged.

Figure 3A:
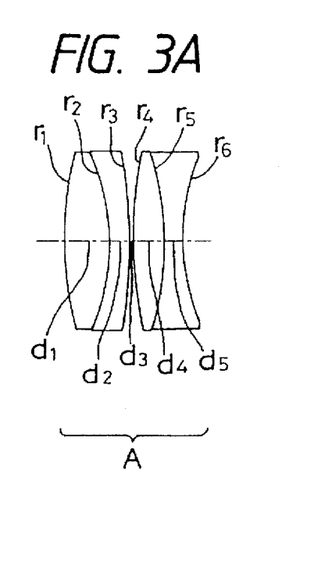
FIG. 3A is a sectional view, developed along an optical axis, showing the configuration of a first positive lens unit of a relay system provided in the microscope optical system of the first embodiment.
Figure 3B:
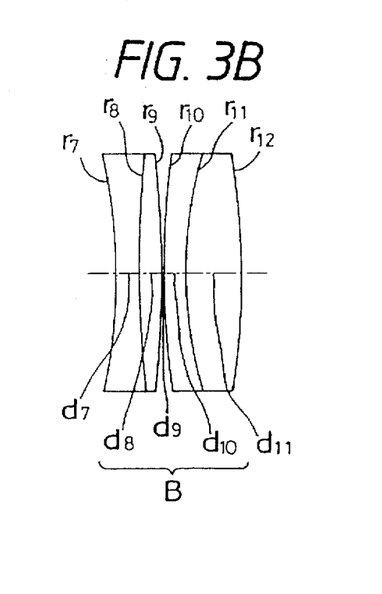
FIG. 3B is a sectional view, developed along the optical axis, showing the configuration of a second positive lens unit of the relay system.

FIGS. 3A and 3B show the configurations of the first positive lens unit A and the second positive lens unit B, respectively, constituting the relay system 10. Either the first positive lens unit A or the second positive lens unit B is designed to have at least one positive lens.

Figure 4A:
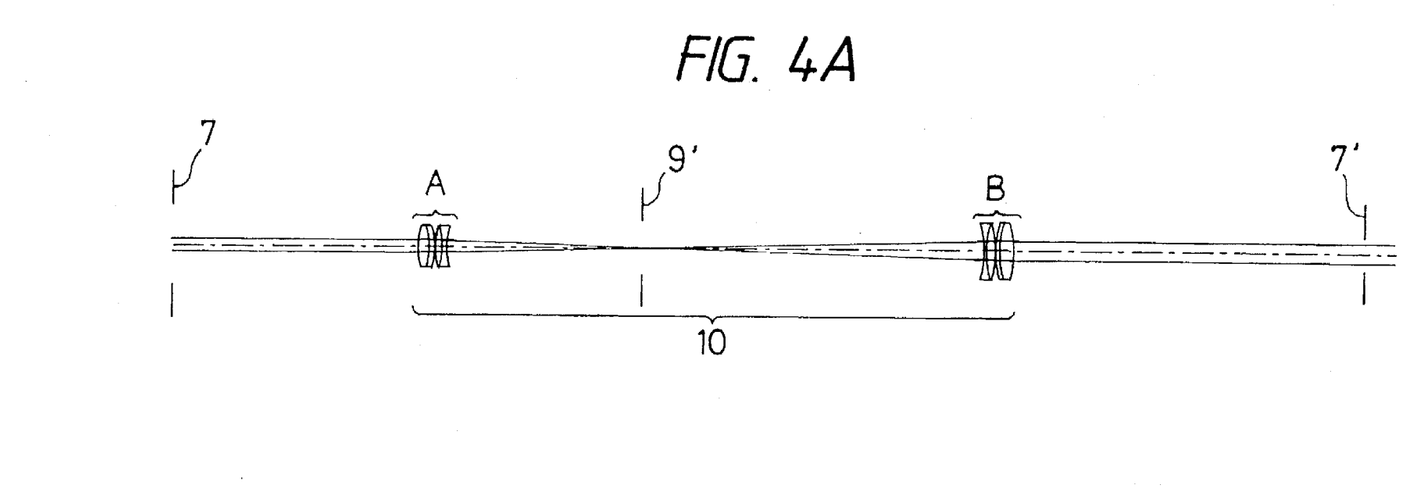
FIG. 4A is a view showing a state where an image is formed which is relayed by the relay system provided in the microscope optical system of the first embodiment.
Figure 4B:
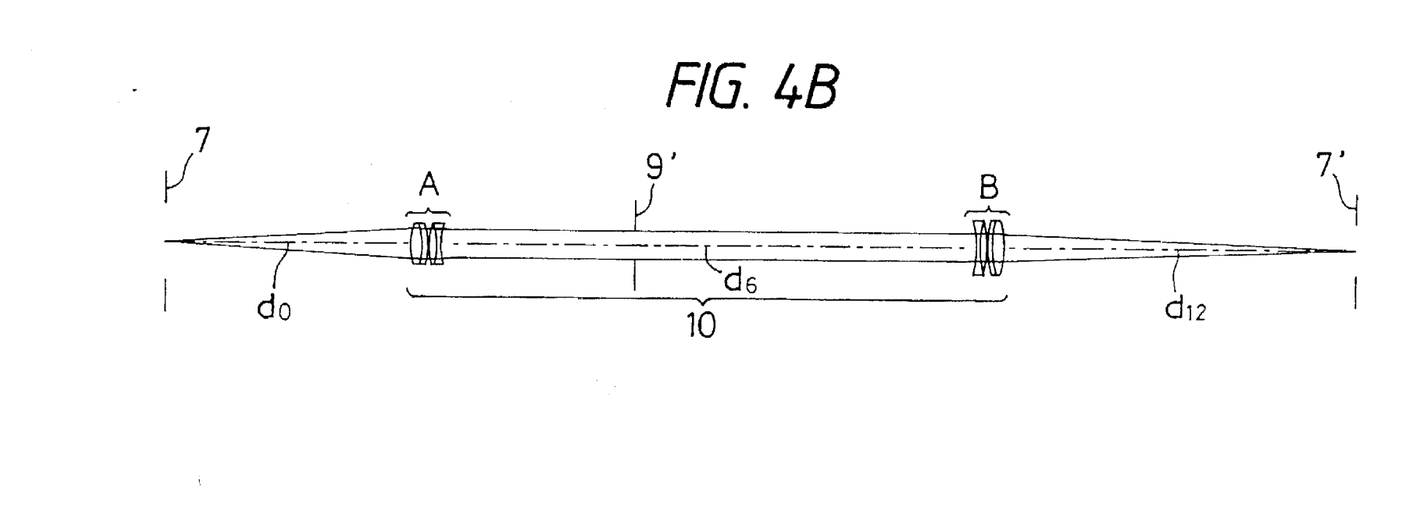
FIG. 4B is a view showing a state where a pupil of an objective lens is imaged which is relayed by the rely system.

FIG. 4A shows the state of the image relayed by the relay system 10. The light emerging from the objective lens 6 is collected by the first positive lens unit A to image the sample 5 at the position 9'. The light traversing the position 9' is collimated by the second positive lens unit B and is introduced into the imaging lens 8. FIG. 4B shows the state of the pupil of the objective lens 6 which is relayed by the relay system 10. Here, the focal length f1 of the first positive lens unit A is 180 mm, while the focal length f2 of the second positive lens unit B is 288 mm. Thus, the relay magnification f2/f1 of the pupil of the relay system 10 becomes 1.6×.

Where a 100× lens (with a focal length of 1.8 mm and a numerical aperture of 1.4) is used in the objective lens 6, the pupil diameter of the objective lens 6 is 2×1.8×1.4=5.04 mm. Hence, the diameter of the pupil relayed by the relay system 10 becomes 8.064 mm, which gives the optimum size of a pupil modulation element. This size is virtually equal, for example, to the effective diameter of a phase plate in an objective lens for phase difference, and the pupil modulation element of such size can be manufactured with great ease.

The relay system 10 constitutes the afocal system, and thus has the following advantages. In the adjustment of the optical system, even though the length of the infinite portion in which a beam of light becomes parallel is changed, a paraxial positional relationship for image formation remains unchanged, and therefore the adjustment of perlocality is easy. Since, for example, a distance between the first and second positive lens units A and B is infinite with respect to the relay of the pupil of the objective lens 6, the adjustment of the distance does not affect the relay of the pupil, and hence the position of the image only can be adjusted. Conversely, a distance between the second positive lens unit B and the image position 7' of the pupil of the objective lens 6 relayed by the relay system 10 is infinite in regard to the relay of the image, and thus the adjustment of the pupil position becomes possible by adjusting the distance.

In the microscope optical system of the first embodiment, the element for pupil modulation is located at the image position 7'. Since the image position 7' is shifted when the magnification of the objective lens 6 is changed, it is desirable that an arrangement is made so that the pupil modulation element can be moved along the optical axis in agreement with the direction in which the image position 7' is shifted.

In the relay system 10 of the microscope optical system of the first embodiment, if the first positive lens unit A is considered as an image relay lens and the second positive lens unit B as a pupil relay lens, chromatic aberration can be corrected for the pupil by using low-dispersion glass in the second positive lens unit. Furthermore, when the low-dispersion glass is used in the first positive lens unit A, it becomes possible to correct for chromatic aberration for the image in combination with the Imaging lens 8.

The following is numerical data of lenses constituting the relay system 10 provided in the microscope optical system of the first embodiment.

| | $d_0 = 197.00$ | | |
|---|---|---|---|
| $r_1 = 68.754$ | | | |
| | $d_1 = 7.73$ | $n_1 = 1.48749$ | $v_1 = 70.21$ |
| $r_2 = -37.568$ | | | |
| | $d_2 = 3.44$ | $n_2 = 1.80610$ | $v_2 = 40.95$ |

-continued

| | | | |
|---|---|---|---|
| $r_3 = -102.848$ | | | |
| | $d_3 = 0.697$ | | |
| $r_4 = 84.310$ | | | |
| | $d_4 = 6.02$ | $n_4 = 1.83400$ | $v_4 = 37.17$ |
| $r_5 = -50.710$ | | | |
| | $d_5 = 3.03$ | $n_5 = 1.64450$ | $v_5 = 40.85$ |
| $r_6 = 40.662$ | | | |
| | $d_6 = 426.734$ | | |
| $r_7 = -104.154$ | | | |
| | $d_7 = 4.20$ | $n_7 = 1.61340$ | $v_7 = 43.84$ |
| $r_8 = 199.976$ | | | |
| | $d_8 = 4.00$ | $n_8 = 1.83400$ | $v_8 = 37.17$ |
| $r_9 = -202.513$ | | | |
| | $d_9 = 0.50$ | | |
| $r_{10} = 157.532$ | | | |
| | $d_{10} = 4.00$ | $n_{10} = 1.80610$ | $v_{10} = 40.95$ |
| $r_{11} = 82.098$ | | | |
| | $d_{11} = 9.78$ | $n_{11} = 1.43875$ | $v_{11} = 94.97$ |
| $r_{12} = -134.412$ | | | |
| | $d_{12} = 279.605$ | | |

Second Embodiment

Figure 5:
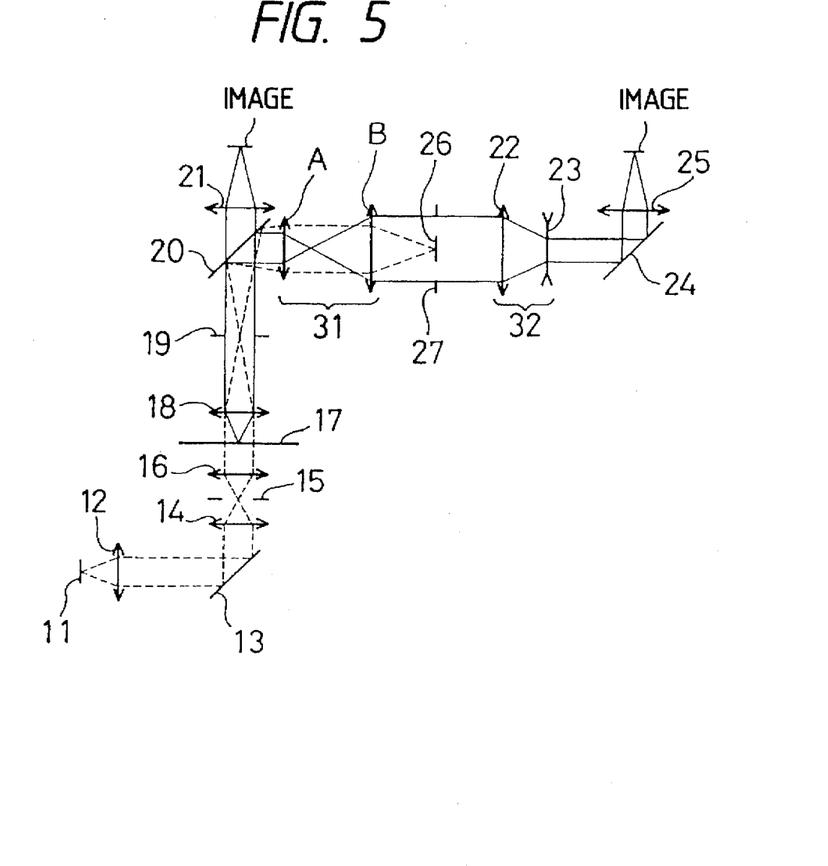
FIG. 5 is a conceptual view showing an arrangement of the microscope optical system of a second embodiment in the present invention.

FIG. 5 shows the arrangement of the microscope optical system, of a transmission type, in this embodiment. Light emitted from a light source 11, after being collimated by a collector lens 12, is reflected by a mirror 13 and radiated, through a lens 14 for adjusting the amount of light, an aperture stop 15, and a condenser lens 16, toward a sample 17. The light transmitted through the sample 17 is rendered parallel by an objective lens 18, and then its optical path is split by a path splitting element 20 such as a half mirror. Part of this light transmitted through the path splitting element 20 forms an image through an imaging lens 21. This image is not subjected to the pupil modulation. On the other hand, remaining light reflected by the path splitting element 20 passes through a first relay system 31 which is afocal, composed of the first positive lens unit A and the second positive lens unit B, and a second relay system 32 which is afocal, composed of a positive lens unit 22 and a negative lens unit 23. The light, after reflection by a mirror 24, forms an image through an imaging lens 25. The image formed here is subjected to the pupil modulation because a pupil modulation element 26 is interposed between the first relay system 31 and the second relay system 32. In the microscope optical system of the second embodiment, each of the first relay system 31 and the second relay system 32 is afocal, and hence the entire relay optical system is also afocal. Also, in this figure, reference numeral 19 denotes the position of the pupil of the objective lens 18, and 27 denotes the position of the image of the relayed pupil of the objective lens 18. The pupil modulation element 26 is placed at the image position 27 of the relayed pupil of the objective lens 18.

Figure 6:
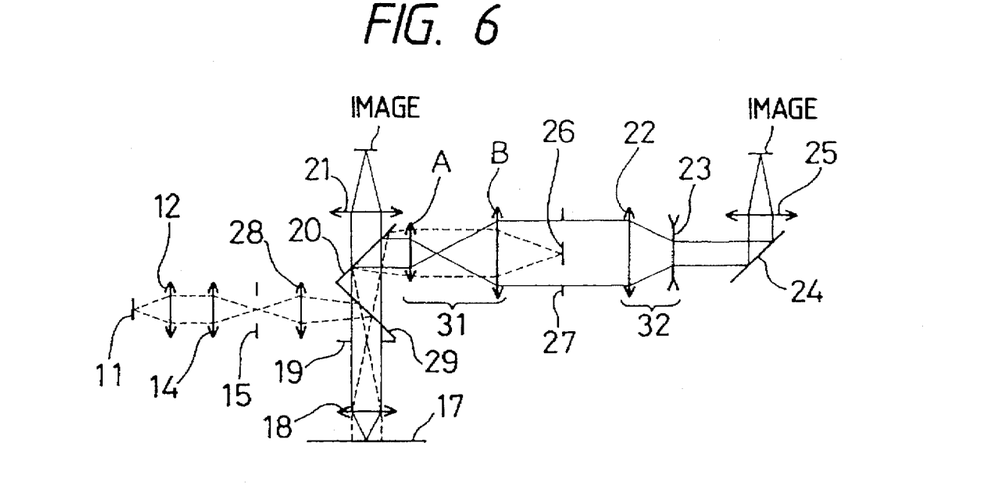
FIG. 6 is a conceptual view showing another arrangement of the microscope optical system of the second embodiment.

FIG. 6 shows the arrangement of the microscope optical system, of a reflection type, in the second embodiment. Light emitted from the light source 11, after being rendered parallel by the collector lens 12, travels through the lens 14 for adjusting the amount of light, the aperture stop 15; and a relay lens 28. After that, the light is reflected by a half mirror 29 and radiated toward the sample 17 through the objective lens 18 also used as a condenser lens. The description of the course subsequent to this which reflected light from the sample 17 follows is omitted because it is the same as that of FIG. 5.

Figure 7A:
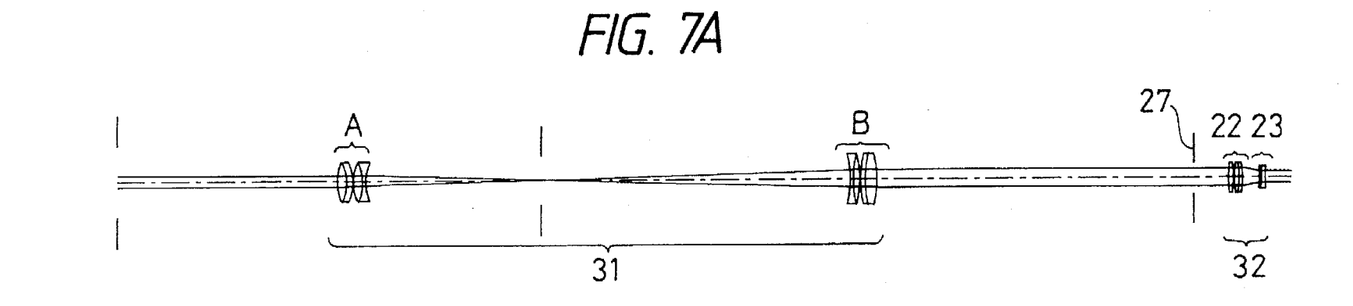
FIG. 7A is a conceptual view for explaining a first relay system and a second relay system provided in the microscope optical system of the second embodiment.
Figure 7B:
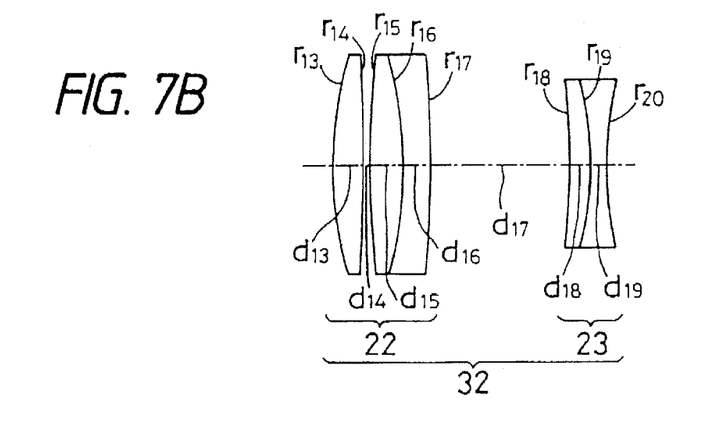
FIG. 7B is a sectional view, developed along the optical axis, showing the lens configuration of the second relay system.

The first and second relay systems 31 and 32 provided in the microscope optical system of the second embodiment shown in each of FIGS. 5 and 6, as illustrated in FIG. 7A, constitute an afocal optical system, and the image position 27 of the relayed pupil of the objective lens 18 is set therebetween. The first relay system 31, which is the same in configuration as the relay system 10 of the first embodiment, is composed of two positive lens units A and B and has the function of relaying the pupil of the objective lens 18. The second relay system 32 includes a positive lens unit 22 and a negative lens unit 23, and its specific lens configuration is as shown in FIG. 7B.

In the second embodiment, the first relay system 31 has a magnification of 1.6× and the second relay system 32 has a magnification of 0.625×, constituting the afocal system with a magnification of 1× in total. Consequently, the relay magnification of the pupil can be set independently of the afocal relay magnification of the image. Furthermore, according to this arrangement, the imaging lenses 21 and 25 of the microscope optical system shown in each of FIGS. 5 and 6 can be constructed with identical lenses, owing to the 1× afocal system.

The following is numerical data of lenses constituting the relay system provided in the microscope optical system of the second embodiment. Also, since the first relay system 31 is the same as the relay system 10 of the first embodiment, its numerical data is omitted.

| | | | |
|---|---|---|---|
| $r_{13} = 41.314$ | | | |
| | $d_{13} = 3.52$ | $n_{13} = 1.48749$ | $v_{13} = 70.21$ |
| $r_{14} = -367.18$ | | | |
| | $d_{14} = 1.20$ | | |
| $r_{15} = 163.098$ | | | |
| | $d_{15} = 3.70$ | $n_{15} = 1.48749$ | $v_{15} = 70.21$ |
| $r_{16} = -49.090$ | | | |
| | $d_{16} = 3.15$ | $n_{16} = 1.69895$ | $v_{16} = 30.12$ |
| $r_{17} = -197.059$ | | | |
| | $d_{17} = 16.13$ | | |
| $r_{18} = -95.011$ | | | |
| | $d_{18} = 2.50$ | $n_{18} = 1.84666$ | $v_{18} = 23.78$ |
| $r_{19} = -34.138$ | | | |
| | $d_{19} = 1.80$ | $n_{19} = 1.72916$ | $v_{19} = 54.68$ |
| $r_{20} = 39.369$ | | | |

Third Embodiment

Figure 8A:
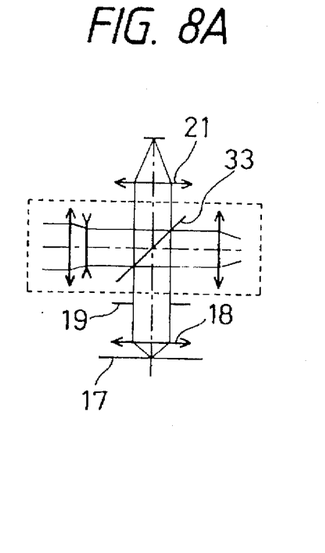
FIG. 8A is a front view showing the conception of the arrangement of the microscope optical system of a third embodiment in the present invention.
Figure 8B:
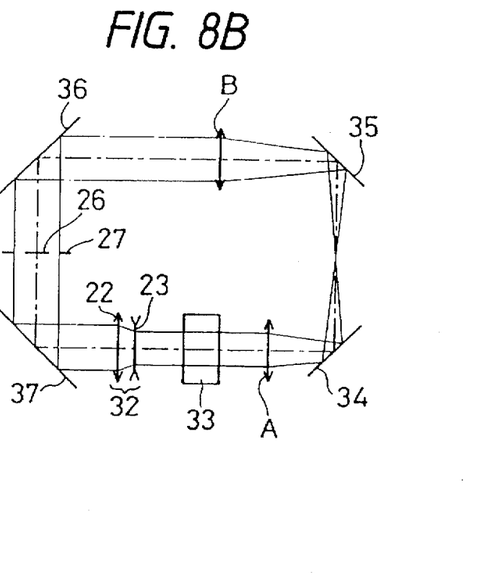
FIG. 8B is a plan view showing the arrangement of essential parts surrounded by a dotted line in FIG. 8A.

In the microscope optical system of this embodiment shown in FIG. 8A, an illumination system identical with that shown in FIG. 5, although it is not shown in FIG. 8A, is placed below the sample 17. The sample 17 is illuminated with light from the illumination system, and the light transmitted through the sample 17 traverses the objective lens 18. Part of this is transmitted through a half mirror 33 and forms the image of the sample 17 through the imaging lens 21. This image is not subjected to the pupil modulation. On the other hand, remaining light reflected by the half mirror 33, as shown in FIG. 8B, after emerging from the first positive lens unit A, is reflected by mirrors 34 and 35 and is incident on the second positive lens unit B. Emergent light from the second positive lens unit B is reflected by mirrors 36 and 37, and then travels through the second relay system 32 composed of the positive lens unit 22 and the negative lens unit 23. The light, after being reflected again by the half mirror 33, forms an Image through the imaging lens 21. This image is subjected to the pupil modulation because the pupil modulation element 26 is disposed at the image position 27 of the relayed pupil of the objective lens 18. The microscope optical system of the third embodiment is such that the first positive lens unit A and the second positive lens unit B constitute the first relay system 31, and each of the first relay system 31 and the second relay system 32 is constructed as the afocal optical system. Also, in the microscope optical system of the third embodiment, the lens configuration of the relay system is exactly the same as that of the second embodiment.

Since the microscope optical system of the third embodiment, as mentioned above, is designed to form a loop path, images with and without the pupil modulation can be observed through the same observing system, without changing the magnifications of the two images.

Figure 9A:
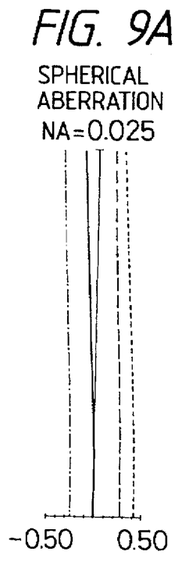
FIGS. 9A, 9B, 9C, and 9D are diagrams showing aberration curves of the microscope optical system of the third embodiment.
Figure 9B:
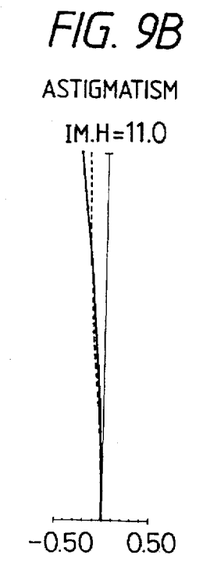
Figure 9C:
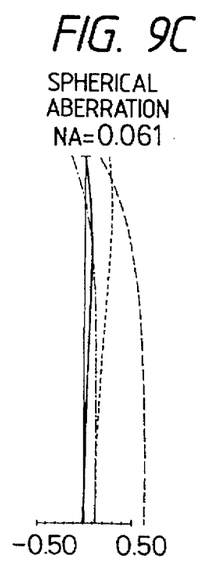
Figure 9D:
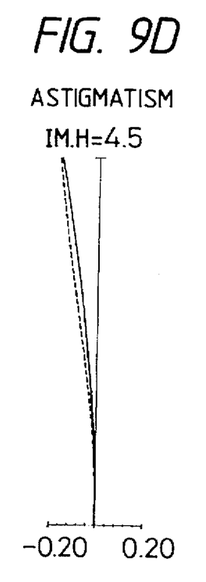

FIGS. 9A and 9B show aberration characteristics of the entire optical system in the case where the first positive lens unit A is used for the imaging lens 21 in the microscope optical system of the third embodiment. FIGS. 9C and 9D show aberration characteristics of the pupil relay system constructed as the afocal system with the first and second relay systems 31 and 32.

Fourth Embodiment

Figure 10:
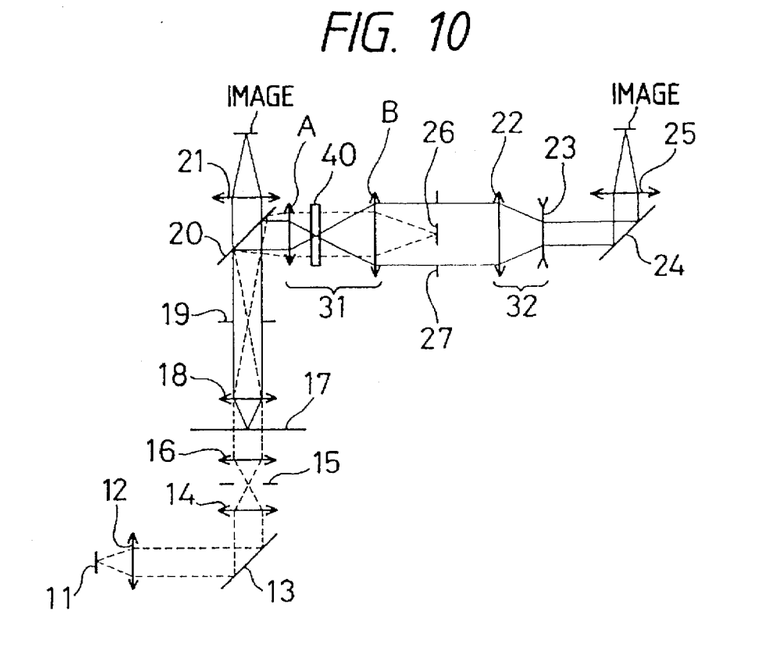
FIG. 10 is a conceptual view showing the arrangement of the microscope optical system of a fourth embodiment in the present invention.
Figure 11:
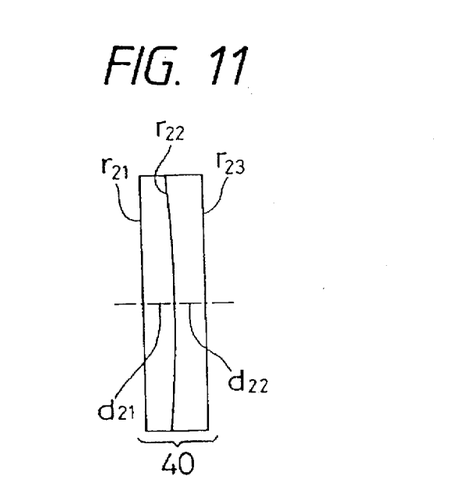
FIG. 11 is a sectional view, developed along the optical axis, showing an optical element for correction for aberrations provided in the microscope optical system of the fourth embodiment.

The arrangement of the microscope optical system of this embodiment, as illustrated in FIG. 10, is basically the same as that of the transmission type optical system of the second embodiment shown in FIG. 5, with the exception that an optical element 40 is located at the position of the intermediate imagine plane of the first relay system 31. The optical element 40 is placed with a view to correcting for aberration for the pupil (notably, chromatic aberration for the pupil of the objective lens 18) which is yielded outside the pupil relay system, and as depicted in FIG. 11, is constructed with a plane-parallel plate including two kinds of glass materials cemented to each other which are nearly equal in refractive index but different in Abbe's number.

The numerical data of the optical element 40 placed in the microscope optical system of the fourth embodiment is shown below.

| | | | |
|---|---|---|---|
| $r_{21} = \infty$ | | | |
| | $d_{21} = 2.70$ | $n_{21} = 1.63930$ | $v_{21} = 44.88$ |
| $r_{22} = -137.119$ | | | |
| | $d_{22} = 2.70$ | $n_{22} = 1.63980$ | $v_{22} = 34.48$ |
| $r_{23} = \infty$ | | | |

Figure 12A:
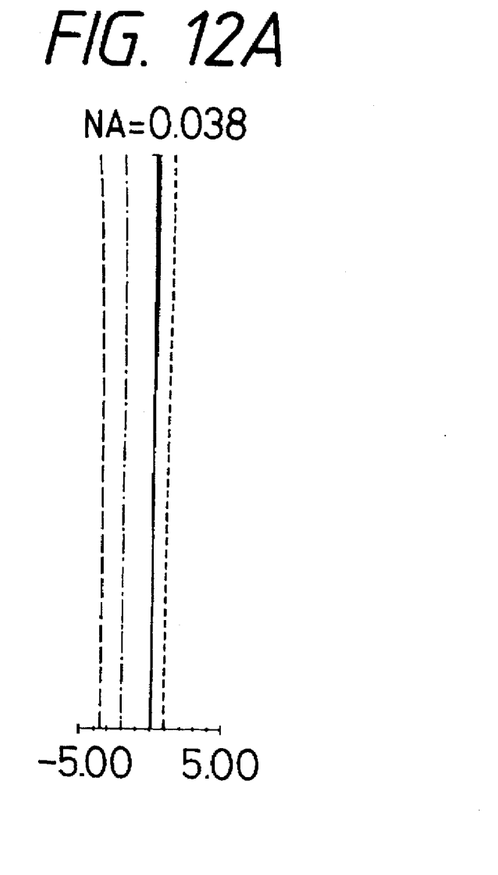
FIGS. 12A and 12B are diagrams showing aberration curves of the microscope optical system of the fourth embodiment.
Figure 12B:
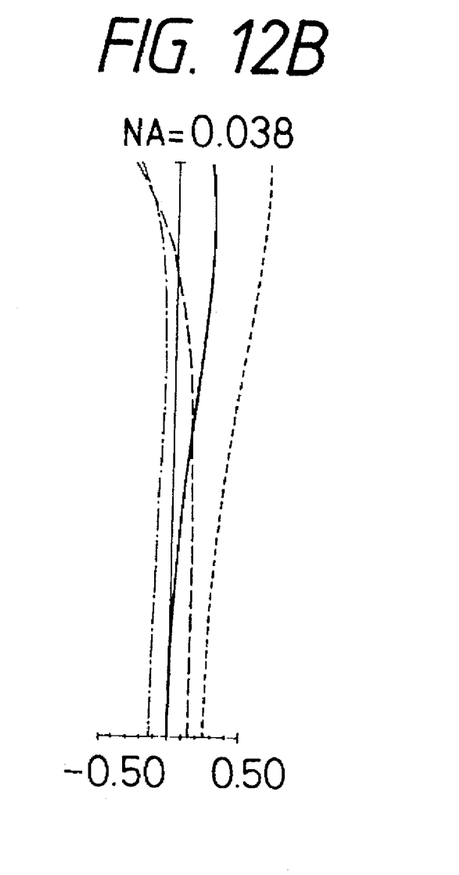

FIG. 12A shows aberration characteristics which would be obtained in case the optical element 40 were removed from the first relay system 31 in the microscope of the fourth embodiment. FIG. 12B shows aberration characteristics of the microscope optical system of the fourth embodiment, where the optical element 40 is placed in the first relay system 31. From these figures, it will be seen that chromatic aberration is favorably improved by the placement of the optical element 40.

What is claimed is:

1. A microscope optical system comprising:

an illumination system for radiating light from a light source toward an object;

an objective lens and an imaging lens for forming an image of said object; and one of an observing optical system for observing the image of said object and a photographing optical system for photographing the image of said object, wherein a relay system constructed as an afocal system with a first positive lens unit and a second positive lens unit is disposed between said objective lens and said imaging lens, and means for pupil modulation can be disposed at a position substantially conjugate with a pupil of said objective lens relayed by said relay system, said relay system satisfying a condition:

$f2/f1 > 1.2$ where f1 is a focal length of the first positive lens unit of said relay system and f2 is a focal length of the second positive lens unit of said relay system.

2. A microscope optical system according to claim 1, wherein one of the first positive lens unit and the second positive lens unit has at least one positive lens, said at least one positive lens satisfying a condition:

$\mu \geq 75$ wherein μ is an Abbe's number of said at least one positive lens.

3. A microscope optical system according to claim 1, wherein path splitting means for splitting an optical path is disposed between said objective lens and said relay system.

4. A microscope optical system according to claim 1, wherein said means for pupil modulation can be moved along an optical axis.

5. A microscope optical system comprising:

an illumination system for radiating light from a light source toward an object;

an objective lens and an imaging lens for forming images of said object; and one of an observing optical system for observing the image of said object and a photographing optical system for photographing the image of said object, wherein a relay optical system including a first afocal relay system and a second afocal relay system is arranged between said objective lens and said imaging lens, and a position substantially conjugate with a pupil of said objective lens is set between said first afocal relay system and said second afocal relay system.

6. A microscope optical system according to claim 5, wherein said first afocal relay system is constructed as an afocal system with a first positive lens unit and a second positive lens unit and satisfies a condition:

$f2/f1 > 1.2$ where f1 is a focal length of the first positive lens unit and f2 is a focal length of the second positive lens unit.

7. A microscope optical system according to claim 5, wherein means for pupil modulation is disposed at the position substantially conjugate with the pupil of said objective lens and can be moved along an optical axis.

8. A microscope optical system comprising:

an illumination system for radiating light from a light source toward an object;

an objective lens and imaging lenses for forming images of said object; and one of an observing optical system for observing the images of said object and a photographing optical system for photographing the images of said object, wherein an image relay lens unit and a pupil relay lens unit are arranged between said objective lens and one of said imaging lenses, optical means for correction for aberrations is disposed adjacent to an Intermediate Imaging plane produced by the image relay lens unit, and means for pupil modulation can be disposed at a position substantially conjugate with a pupil of said objective lens relayed by the pupil relay lens unit.

9. A microscope optical system according to claim 8, wherein said optical means for correction for aberrations disposed adjacent to the intermediate imaging plane is constructed with a plane-parallel plate including two kinds of glass materials, substantially equal in refractive index but different in Abbe's number, cemented to each other.

* * * * *